United States Patent
Kueny et al.

(10) Patent No.: US 10,976,734 B2
(45) Date of Patent: Apr. 13, 2021

(54) AUGMENTED REALITY (AR) DISPLAY OF PIPE INSPECTION DATA

(71) Applicant: RedZone Robotics, Inc., Warrendale, PA (US)

(72) Inventors: Todd Kueny, Tarentum, PA (US); Justin Starr, Baden, PA (US); Timothy Renton, Aukland (NZ); Antony van Iersel, Auckland (NZ)

(73) Assignee: RedZone Robotics, Inc., Warrendale, PA (US)

( * ) Notice: Subject to any disclaimer, the term of this patent is extended or adjusted under 35 U.S.C. 154(b) by 0 days.

(21) Appl. No.: 16/841,642

(22) Filed: Apr. 6, 2020

(65) Prior Publication Data

US 2020/0301412 A1 Sep. 24, 2020

Related U.S. Application Data

(63) Continuation of application No. 16/263,052, filed on Jan. 31, 2019, now Pat. No. 10,649,450.

(Continued)

(51) Int. Cl.
| | |
|---|---|
| *G05D 1/00* | (2006.01) |
| *G06Q 50/08* | (2012.01) |
| *G06T 19/00* | (2011.01) |
| *G02B 27/01* | (2006.01) |
| *G06F 3/01* | (2006.01) |

(Continued)

(52) U.S. Cl.
CPC ........... *G05D 1/0044* (2013.01); *G02B 27/01* (2013.01); *G02B 27/017* (2013.01); *G06F 3/011* (2013.01); *G06F 3/017* (2013.01); *G06F 3/04815* (2013.01); *G06Q 50/08* (2013.01); *G06T 19/00* (2013.01); *G06T 19/006* (2013.01); *G02B 2027/014* (2013.01); *G02B 2027/0138* (2013.01); *G02B 2027/0187* (2013.01); *G05D 2201/0207* (2013.01); *G06Q 10/06* (2013.01); *G06T 2219/021* (2013.01)

(58) Field of Classification Search
None
See application file for complete search history.

(56) References Cited

U.S. PATENT DOCUMENTS

| | | | | |
|---|---|---|---|---|
| 9,536,351 B1* | 1/2017 | Cote | ................ | G06F 3/017 |
| 2011/0251456 A1* | 10/2011 | Jacobsen | ................ | A61B 1/042 |
| | | | | 600/109 |

(Continued)

FOREIGN PATENT DOCUMENTS

WO    WO-2006078873 A2 *  7/2006    ............. H04N 7/185

*Primary Examiner* — Jwalant Amin
(74) *Attorney, Agent, or Firm* — Cafardi, Ferguson, Wyrick, Weis & Gabriel, LLC; Andrew M. Gabriel

(57) ABSTRACT

Described is a method of providing an augmented reality (AR) scene of pipe inspection data, including: obtaining, using a processor, pipe inspection data derived from a pipe inspection robot that traverses through the interior of an underground pipe, the pipe inspection data including one or more sets of condition assessment data relating to an interior of the underground pipe; obtaining, using a processor, real-time visual image data of an above-ground surface; combining, using a processor, the pipe inspection data with the real-time visual image data in an AR scene; and displaying, using a display device, the AR scene. Other examples are described and claimed.

18 Claims, 8 Drawing Sheets

Related U.S. Application Data

(60) Provisional application No. 62/624,838, filed on Feb. 1, 2018.

(51) Int. Cl.
*G06F 3/0481* (2013.01)
*G06Q 10/06* (2012.01)

(56) References Cited

U.S. PATENT DOCUMENTS

2016/0261829 A1* 9/2016 Olsson .................. G03B 17/561
2016/0292927 A1* 10/2016 Finn .......................... G06T 7/50

* cited by examiner

AUGMENTED REALITY (AR) DISPLAY OF PIPE INSPECTION DATA

CROSS REFERENCE TO RELATED APPLICATIONS

This application is a continuation application of U.S. patent application Ser. No. 16/263,052, filed on Jan. 31, 2019, which in turn claims priority to U.S. provisional patent application Ser. No. 62/624,838, filed on Feb. 1, 2018, each prior application being entitled "AUGMENTED REALITY (AR) DISPLAY OF PIPE INSPECTION DATA," the contents of each prior application are incorporated by reference herein.

BACKGROUND

Pipes that carry water, other fluids and gases are an important type of infrastructure. A great deal of pipe data is captured in still images or video, e.g., using cameras to record information from the visible spectrum of light. However, other data can provide additional information beyond what is visible to the naked eye. For example, acoustic, ultraviolet (UV), laser, and infrared (IR) imaging have been utilized to identify details related to pipe topology or condition.

Various systems exist that create pipe inspection data, for example obtained via a pipe inspection robot, in a variety of formats. Conventionally pipe inspection data is presented in a two-dimensional (2D) format as either still image data or video data. Some systems are capable of presenting three-dimensional (3D) information in the form of 3D-like graphics that are presented on a flat (2D) screen.

BRIEF SUMMARY

In summary, one embodiment provides a method of providing an augmented reality (AR) scene of pipe inspection data, comprising: obtaining, using a processor, pipe inspection data derived from a pipe inspection robot that traverses through the interior of an underground pipe, the pipe inspection data including one or more sets of condition assessment data relating to an interior of the underground pipe; obtaining, using a processor, real-time visual image data of an above-ground surface; combining, using a processor, the pipe inspection data with the real-time visual image data in an AR scene; and displaying, using a display device, the AR scene.

Another embodiment provides a device, comprising: a display device; a camera; a processor; and a memory that stores processor executable instructions comprising: instructions that obtain, using the processor, pipe inspection data derived from a pipe inspection robot that traverses through the interior of an underground pipe, the pipe inspection data including one or more sets of condition assessment data relating to an interior of the underground pipe; instructions that obtain, using the camera, real-time visual image data of an above-ground surface; instructions that combine, using the processor, the pipe inspection data with the real-time visual image data in an AR scene; and instructions that display, using the display device, the AR scene.

A further embodiment provides a computer program product, comprising: a non-transitory storage medium that stores processor executable instructions, comprising: instructions that obtain pipe inspection data derived from a pipe inspection robot that traverses through the interior of an underground pipe, the pipe inspection data including one or more sets of condition assessment data relating to an interior of the underground pipe; instructions that obtain real-time visual image data of an above-ground surface; instructions that combine the pipe inspection data with the real-time visual image data in an AR scene; and instructions that display, using the display device, the AR scene.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, in conjunction with the accompanying drawings.

DETAILED DESCRIPTION

Figure 1:
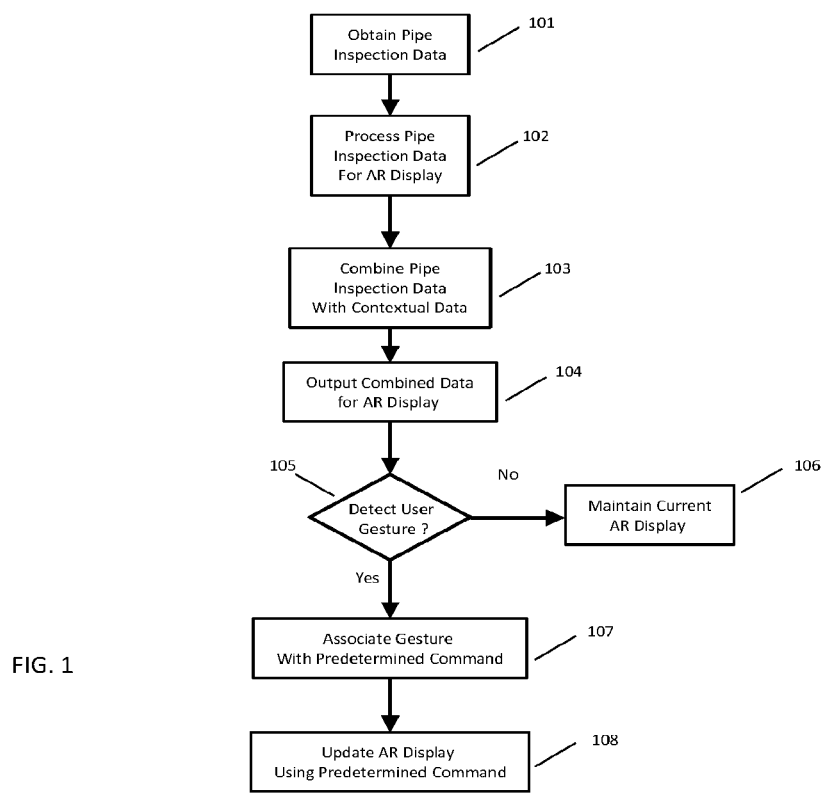
FIG. 1 illustrates an example method of providing pipe inspection data to an augmented reality view.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Even if a pipe inspection robot is utilized, the resultant data produced by conventional systems is often difficult for the end user to grasp. The pipe inspection data may be processed to relate 2D and 3D information of the pipe's interior; however, this data is often difficult to interpret visually in 2D display formats. Moreover, for a given pipe segment, although its inspection data may be relevant and understood by the end user, its place or overall context within the pipe network may be difficult to grasp, as some pipe networks are quite extensive. These technical issues present problems for end users that need to make decisions regarding the pipe network, e.g., city managers that must decide whether to expend resources rehabilitating or replacing particular segments of pipe within a pipe network.

Accordingly, an embodiment provides methods, devices and products for more effectively visualizing the interior of a pipeline by using an augmented reality (AR) system. The AR system combines virtual representations, e.g., 3D pipe LIDAR (light detecting and ranging) scan data, with visual images, e.g., the above ground view of the pipe location. Users may therefore gain a better perspective for the condition of a pipe segment and where it is located within a pipe network by utilizing an AR system.

In an embodiment, an AR scene of pipe inspection data is provided by obtaining, using a processor, pipe inspection data derived from a pipe inspection robot that traverses through the interior of an underground pipe. The pipe inspection data includes one or more sets of condition assessment data, for example laser scan data, sonar scan data, and visual image data, relating to an interior of the underground pipe. A processor obtains real-time visual image data of an above-ground surface, e.g., from a camera included in a mobile device such as a tablet, smartphone or heads up or head mounted display. A processor combines the pipe inspection data, which may be in the form of a cylindrical, three-dimensional (3D) representation of the pipe formed using laser scan data, with the real-time visual image data into an AR scene. The AR scene is then displayed using a display device, e.g., included in the mobile device.

In an embodiment, a user input is detected and the display of the AR scene is updated in response to the user input. The user input may include one or more of movement of the display device (e.g., panning, tilting or zooming the mobile device display, as detected via an accelerometer, gyroscope or other sensor(s)), gesture input and voice input. The updating of the display of the AR scene includes repositioning one or more of the pipe inspection data (e.g., a 3D scan image of the pipe) and the real-time visual image data within the AR scene. The updating of the display of the AR scene may include repositioning the pipe inspection data, e.g., relative to the real-time visual image data, in response to user input selected from the group consisting of gesture input and voice input. This allows, for example, the pipe inspection data to be independently repositioned, e.g., raised up with respect to the image of the surface of the ground, or transformed, e.g., transitioned from a 3D pipe representation to a planar or flat graph representation.

In an embodiment, the pipe inspection data includes data relating to an in-ground position of the underground pipe and the real-time visual image data includes surface feature data indicating a position of a surface feature. In an embodiment, the combining of the real-time visual images and the pipe inspection data includes using the data relating to the in-ground position of the underground pipe to align at least a part of the pipe inspection data with the surface feature in the real-time visual image data. For example, computer vision techniques such as pattern matching, object identification, and the like can be used to detect the surface feature in the real-time visual image and an embodiment can detect a related in-ground position feature in the pipe inspection data to align at least a part of the pipe inspection data, e.g., an opening for a manhole cover, with the surface feature identified in the real-time visual image data, e.g., the corresponding physical manhole cover. Other position data may be used to assist this process or in lieu of computer vision techniques. For example, GPS or other location data or orientation data such as compass data may be used to determine the location and direction of the view offered by real-time visual images and position the pipe inspection data in the AR scene.

The description now turns to the figures. The illustrated example embodiments will be best understood by reference to the figures. The following description is intended only by way of example and simply illustrates certain selected example embodiments.

Referring to FIG. 1, as illustrated at 101 an embodiment obtains pipe inspection data, e.g., visual image data, laser scan data, etc., of a segment of a pipe, collected as the pipe inspection robot traverses through the interior of the pipe. The pipe inspection data may be collected by at least one sensor or an array of sensors mounted to a mobile inspection robot, e.g., LIDAR units, sonar units, and a visual camera.

At 102 an embodiment processes the collected pipe inspection data to format it appropriately for AR display. By way of example, a laser scan image of the interior of the pipe may be formed into a cylindrical length of pipe. Colors or other visual data may indicate the internal contours of the pipe's interior surface, e.g., sediment buildup or erosion/cracks in the pipe wall.

An embodiment combines the processed pipe inspection data with contextual data at 103, e.g., combined with visual images of the surface of the ground, to form an AR scene or view of a pipe segment in context, e.g., as it sits in the ground beneath a surface location. This combination with contextual data may take place in real-time (which includes "near" real-time, as will be understood by those having ordinary skill in the art). For example, the combination may occur as the pipe inspection robot traverses through the interior of the pipe, or later. Further, the contextual data may be obtained in real time, e.g., as the user walks along the surface above the pipe. This composite image is output at 104 to an appropriate display device, permitting a user to view the pipe scan data in a new context, e.g., through a head mounted display, on a device screen pointed at the surface location, etc.

As illustrated at 105, if a user provides an input such as a gesture detected by a head mounted display, the AR display may be modified, e.g., moving the pipe scan data/virtual image relative to the real, visual image. Otherwise, the current AR display or scene may be maintained, as illustrated at 106.

By way of example, an association may be made, e.g., based on a predetermined or coded rule, between a gesture detected from the user and a modification of the AR scene. By way of specific example, a predetermined gesture such as raising a hand may result in a predetermined scene change, e.g., moving the pipe scan virtual image relative to the visual image to lift the pipe virtually out of the ground for above surface viewing. This permits the user to manipulate the AR scene, as illustrated at 107 and 108.

Figure 2A:
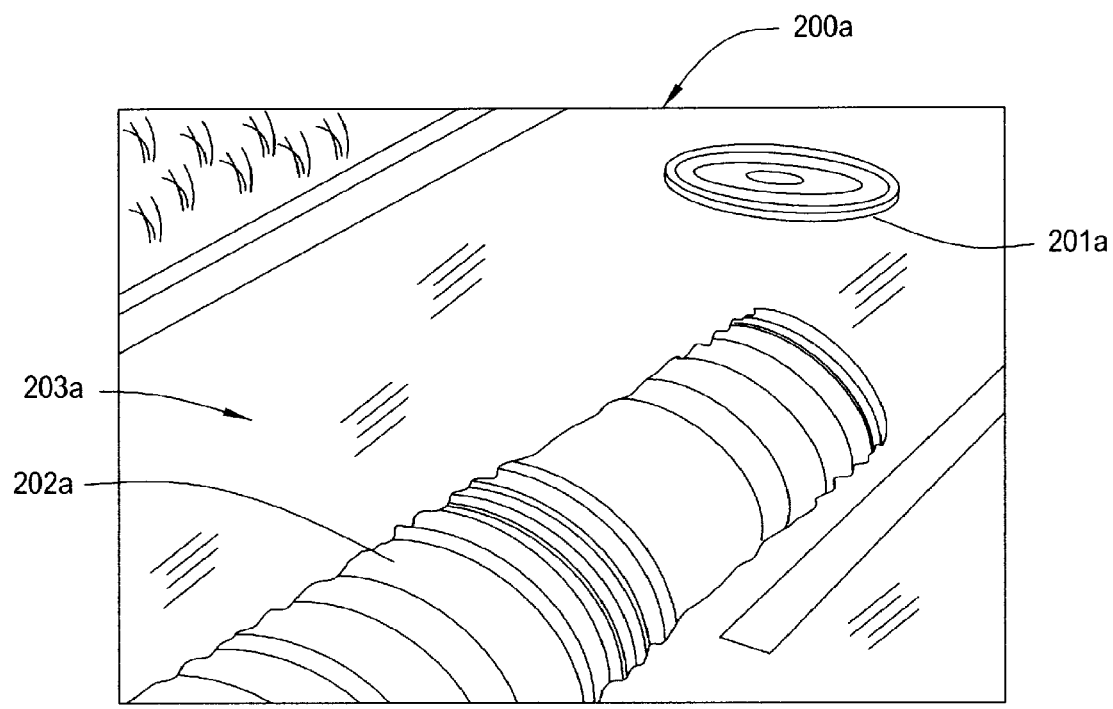
FIG. 2(A-B) illustrates example views of an augmented reality display of pipe inspection data.
Figure 2B:
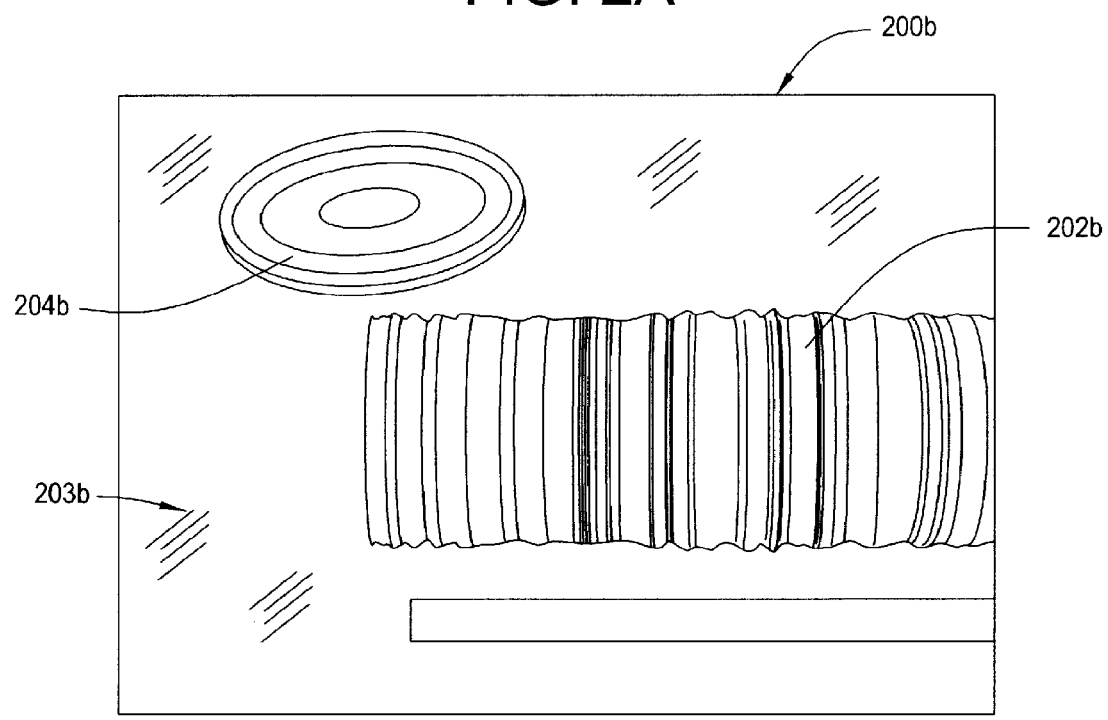

Illustrated in FIG. 2A-B are example views of an AR scene 200a, 200b produced by an embodiment. As shown in FIG. 2A, an embodiment provides an AR scene 200a that combines virtual images of a virtual manhole cover 201a and laser pipe scan data 202a with visual images of the surface of the ground 203a. As illustrated, the virtual manhole cover 201a is situated above the pipe scan data 202a in the AR scene 200a. Thus, the distance between the pipe scan data 202a and the virtual manhole cover 201a in the AR scene 200a represents the distance between the physical pipe and the physical manhole cover. In an embodiment, the scale or distance between a virtual manhole cover 201a and pipe scan data 202a (or other features) may be changed.

In an embodiment, the virtual features, e.g., features 201a, 202a, may be aligned or oriented with features of the visual image 203a. This alignment of features corresponds to the actual orientation of physical elements, such as an underground pipe, to which the virtual features correspond. For example, the position of the physical pipe as it sits beneath the ground is mimicked in the AR scene 200a by aligning the pipe scan data 202a within the AR scene 200a appropriately.

In an embodiment, features within pipe scan data 202a and visual image data 203a are used to align the elements within the AR scene 200a. That is, feature locations within the pipe scan data 202a are aligned with surface features in the visual image 203a so as to present an AR scene 200a that represents the pipe's actual (or scaled) location within ground and aligned appropriately within the visual image 203a. The pipe's location within the ground may be obtained or aligned, for example, using marker data found within the pipe scan data 202a, e.g., data indicating a location of a feature in the pipe such as an opening for a manhole cover or a marker within the pipe of a manhole position.

The features (surface or subterranean) may be detected and identified automatically, e.g., using computer vision or pattern matching techniques to identify such features. In an embodiment, a pipe inspection robot may be configured to automatically detect such features in pipe inspection data (e.g., laser scan data). An embodiment may likewise automatically detect surface features in the visual image data (e.g., real-time visual images of the surface of the ground) and relate these to features in the pipe inspection data.

Having obtained feature(s) from the pipe inspection data, the feature(s) within the visual images are related thereto for use in building the AR scene 200a. For example, to align the pipe scan data 202a within the AR scene 200a, an embodiment may automatically detect a physical feature in an underground pipe. The feature may be a feature that can be scanned such as a hole in the interior of the pipe that is sized and/or located in a pipe segment where a manhole opening is expected, a marker of a manhole entry, etc. Similarly, an embodiment may detect a surface feature that is visually scanned or identified from a visual image 203a, such as labeling on a manhole cover. An embodiment automatically identifies these features, e.g., using matching to known features. In an embodiment, a physical surface feature of at least 2 inches in size is used to facilitate such identification using computer vision techniques. Features in the pipe scan data 202a are then related to features within the visual image 203a, e.g., using rules or machine learning. For example, a hole within a pipe scan 202a may be aligned with a physical manhole location identified in a visual image and scaled to appear below it in the AR scene 200a. Depending on the state of the AR scene 200a, the pipe scan data 202a may be located a predetermined distance below the location of the physical manhole identified in the visual image 203a to mimic the pipe's in-ground location.

As illustrated in FIG. 2B, a user may reposition the viewing device, e.g., a head set, a mobile device such as a smart phone or tablet, etc., to view other areas of the pipe scan data. For example, the view in FIG. 2B is the result of a user panning the device to view to the left with respect to FIG. 2A, e.g., by moving the AR headset to the left to view the left side of the pipe scan data 200a. As such, the user can view the updated AR scene 200b, including the left side of the pipe scan data 202b, another area of the surface of the ground 203b, and a different virtual manhole cover 204b. In this case, the user is providing inputs via device movement, detected using device sensors such as an accelerometer.

Figure 3A:
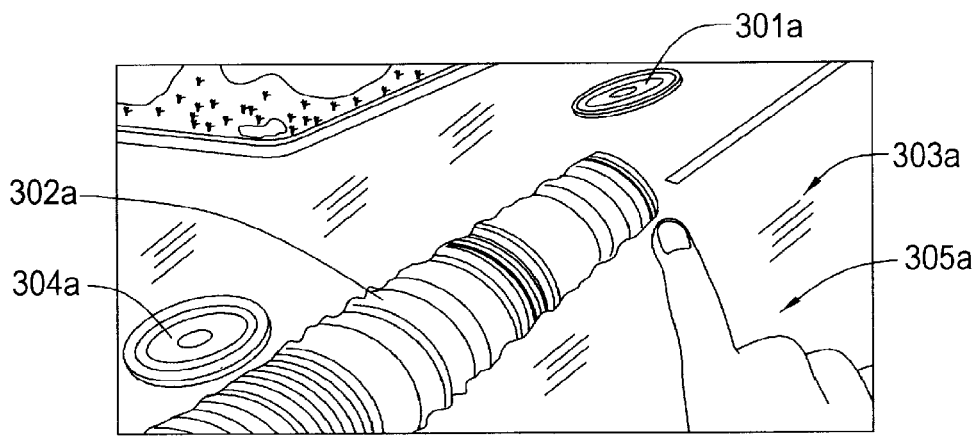
FIG. 3(A-C) illustrates example views of controlling an augmented reality display of pipe inspection data.
Figure 3B:
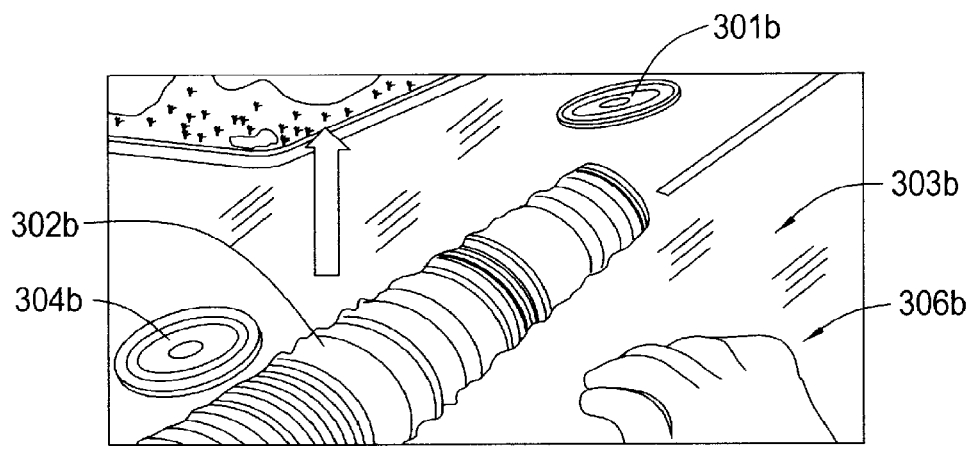
Figure 3C:
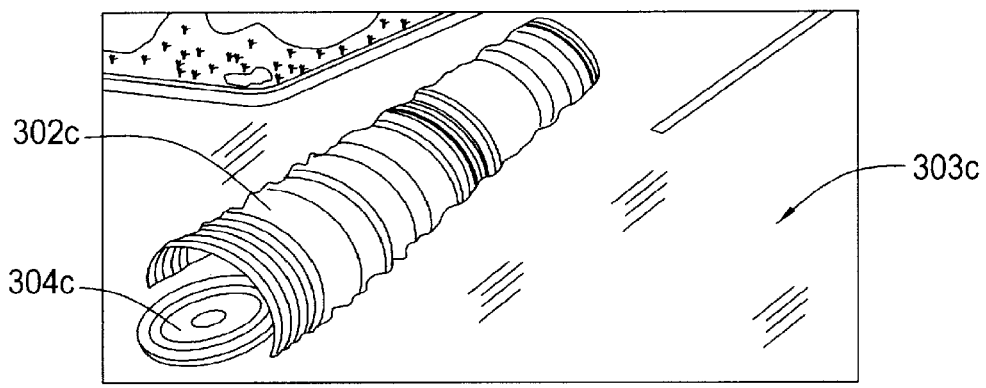

FIG. 3A-C illustrates successive views where an AR scene is updated by other user input, e.g., a hand gesture viewed by a camera of a head mounted display. In FIG. 3A-C, the right end of the pipe scan image (302a-c) is closest to the user. In FIG. 3A, the AR scene includes virtual manhole 301a, pipe scan data or image 302a, surface/visual imagery 303a, and virtual manhole 304a, in a first orientation. As can be appreciated, the visual images are captured in real time and combined with the pipe scan data (which may have been obtained at an earlier time). The user's hand is visible in a first orientation 305a.

In FIG. 3B, the user has performed a pinch gesture 306b, which changes or updates the AR scene. In this example, the pinch gesture 306b is associated with a coded rule that lifts or raises the pipe scan data 302b relative to the ground imagery 303b and the virtual manholes 301b, 304b.

As shown in FIG. 3C, the pipe scan data 302c lifts or raises itself above the virtual manhole 304c and relative to the ground imagery 303c. This permits the user to view the pipe scan data 302c from a different angle, e.g., the user can lift the pipe scan data 302c into the air for a closer look or to view the underside of the pipe scan data 302c.

Figure 4A:
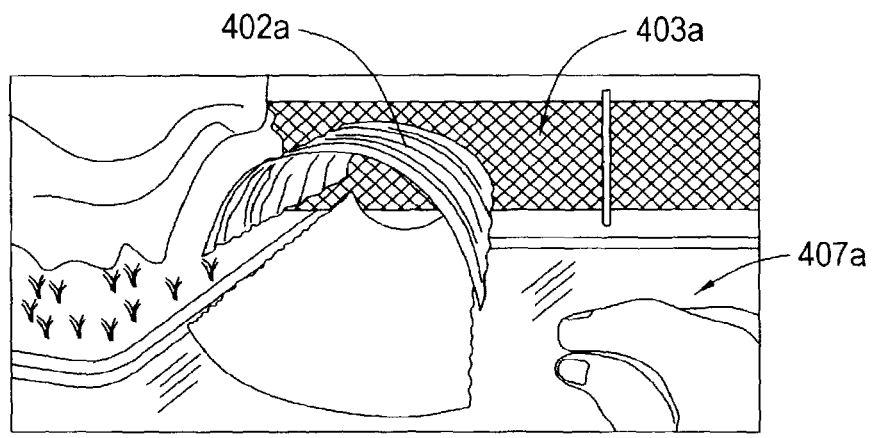
FIG. 4(A-C) illustrates example views of controlling an augmented reality display of pipe inspection data.
Figure 4B:
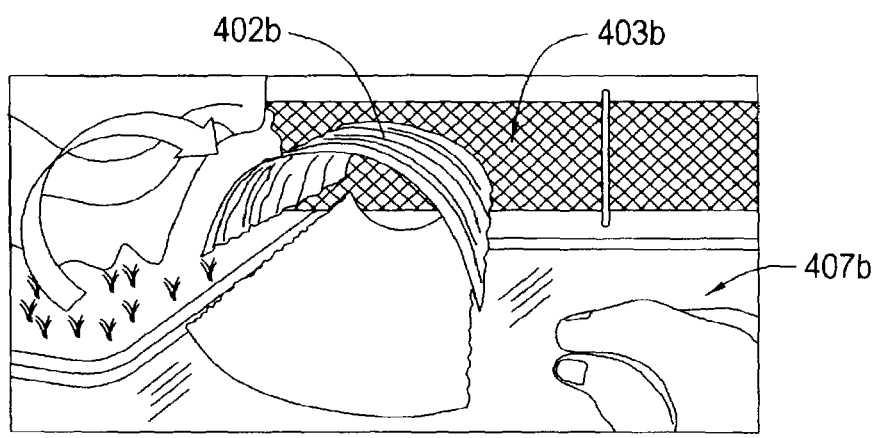
Figure 4C:
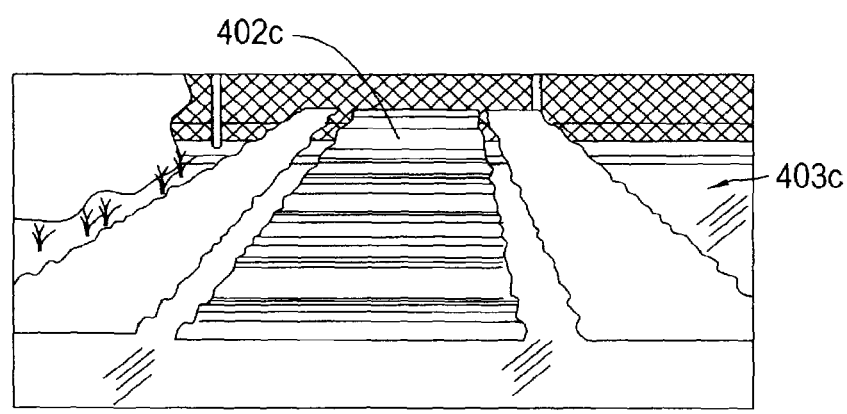

FIG. 4A-C illustrates another example modification of an AR scene. In FIG. 4A-C, the user has moved (e.g., walked) nearer to the right end of the pipe scan image (402a-c), making this end closer to the user (i.e., the user is looking down the length of the pipe scan image 402(a-c) from the right end to the left end). In this example, after the user has lifted or raised the pipe scan data 402a with respect to visual imagery 403a, a second user pinch gesture 407a begins an animation of the pipe scan data 402a unraveling to reveal a flat graph view 402c of the pipe's interior (as illustrated by the sequence of FIG. 4B-C). Therefore, the pipe scan data transitions through views 402b, 402c, with respect to the visual imagery 403b, 403c in the AR scene.

Figure 5:
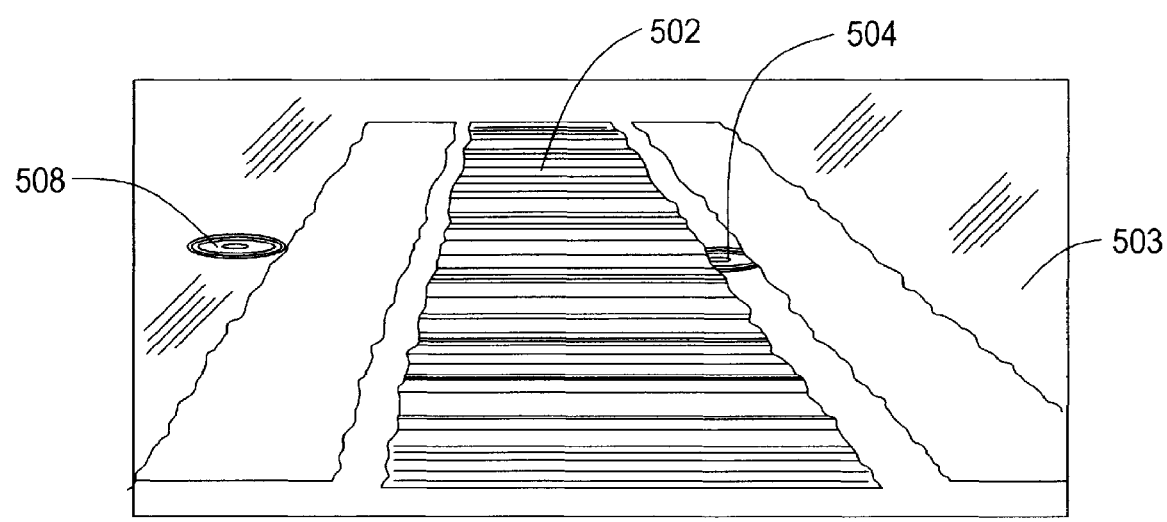
FIG. 5 illustrates an example augmented reality display of pipe inspection data.

FIG. 5 shows an example view of a resultant flat graph view of the pipe scan data 502 that results from the operation performed in FIG. 4A-C. As shown, the user has moved or panned to another location on the surface of the ground to look at the pipe scan data 502, e.g., the user has waked down the left end of the pipe scan data to view the pipe scan data from the other end, from the right end to the left end. As illustrated, the view of the flat graph 502 is maintained relative to the surface imagery 503, which includes physical manhole cover 508 (corresponding to virtual manhole cover 504).

Figure 6:
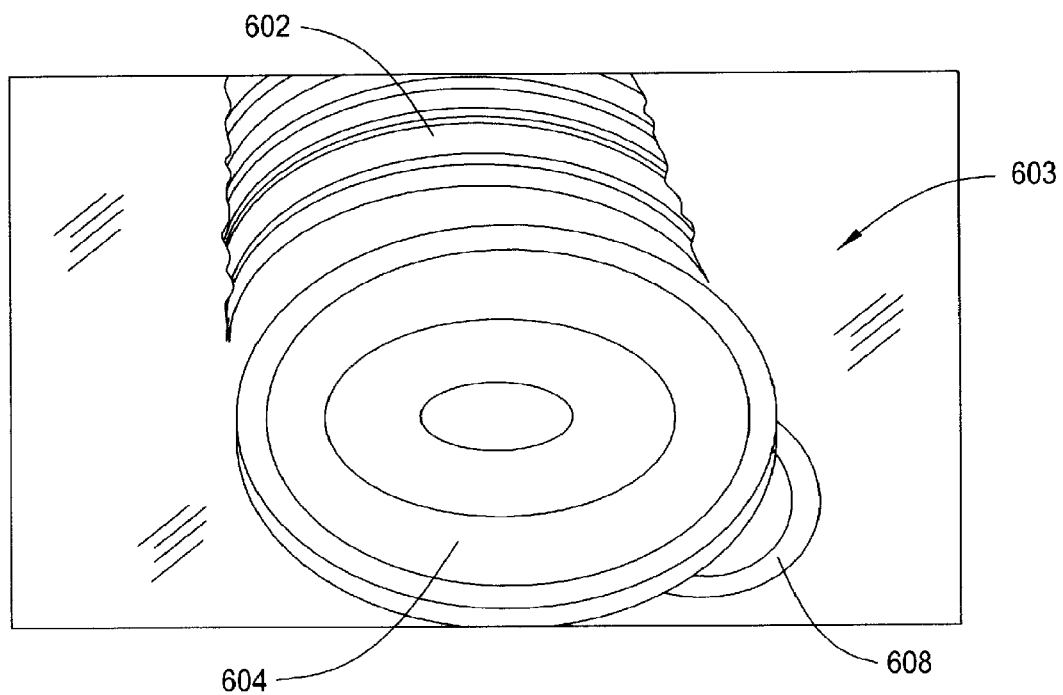
FIG. 6 illustrates an example augmented reality display of pipe inspection data.

In an embodiment, the pipe scan data is maintained in an actual or relative location with respect to the visual imagery using location markers and/or GPS data. For example, in FIG. 6 the pipe scan data 602 is aligned with a virtual manhole cover 604 as well as the actual manhole cover 608. This permits a user to view the pipe scan data 602 in context, i.e., where the pipe actually sits (or relative thereto, e.g., raised by gesture or another user input). Again, a relative marker may be identified using computer vision techniques (e.g., matching lettering on a manhole cover) and relating a characteristic in the visual image, e.g., location of a detected manhole cover in visual image, with location of the end of the pipe scan data 602 and virtual manhole cover 604, forming a contextually accurate AR scene.

Figure 8:
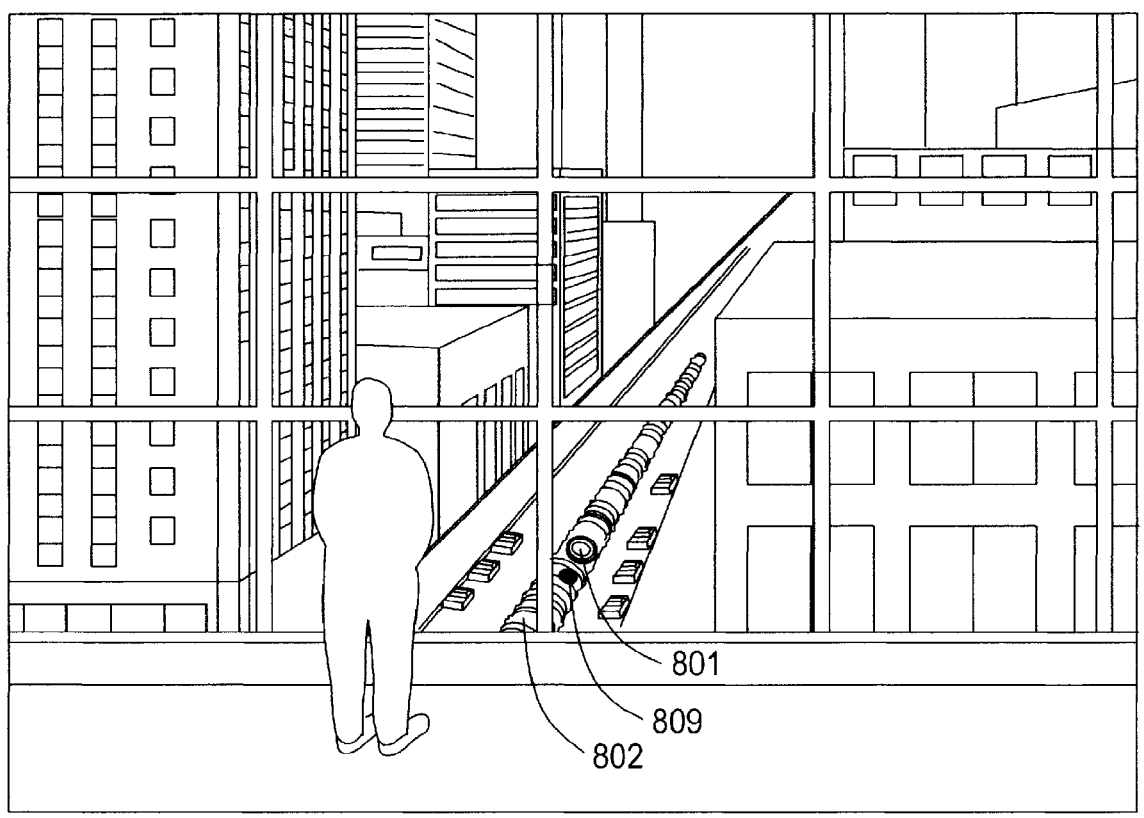
FIG. 8 illustrates an example of augmented reality display of pipe inspection data.

In an embodiment, the pipe scan data can be combined with detailed visual imagery to provide a contextual view, e.g., a pipe scan data location within a city street, as illustrated in FIG. 8. As illustrated, pipe scan data 802 and a virtual manhole cover 801 are aligned with one another, as described herein. In the example of FIG. 8, the virtual manhole cover 801 is situated (virtually) above the opening 809 in the pipe scan data 802. Such features as virtual manhole cover 801 and opening 809 permit an embodiment to align the pipe scan data within an AR scene that includes visual images. For example, these features 801, 809 permit an embodiment to align the pipe scan data 802 with real world features such as an above ground manhole cover within the AR scene. This alignment may be refined with additional data, e.g., GPS data, map data (e.g., of pipe segment locations located in a city street), etc. Furthermore, an embodiment may roughly align the pipe scan data 802 using certain data, e.g., GPS data, map data, etc., rather than aligning virtual and visual feature using computer vision, which may be appropriate in certain circumstances such as when a precise location of the pipe scan data is not needed or desired.

Figure 7:
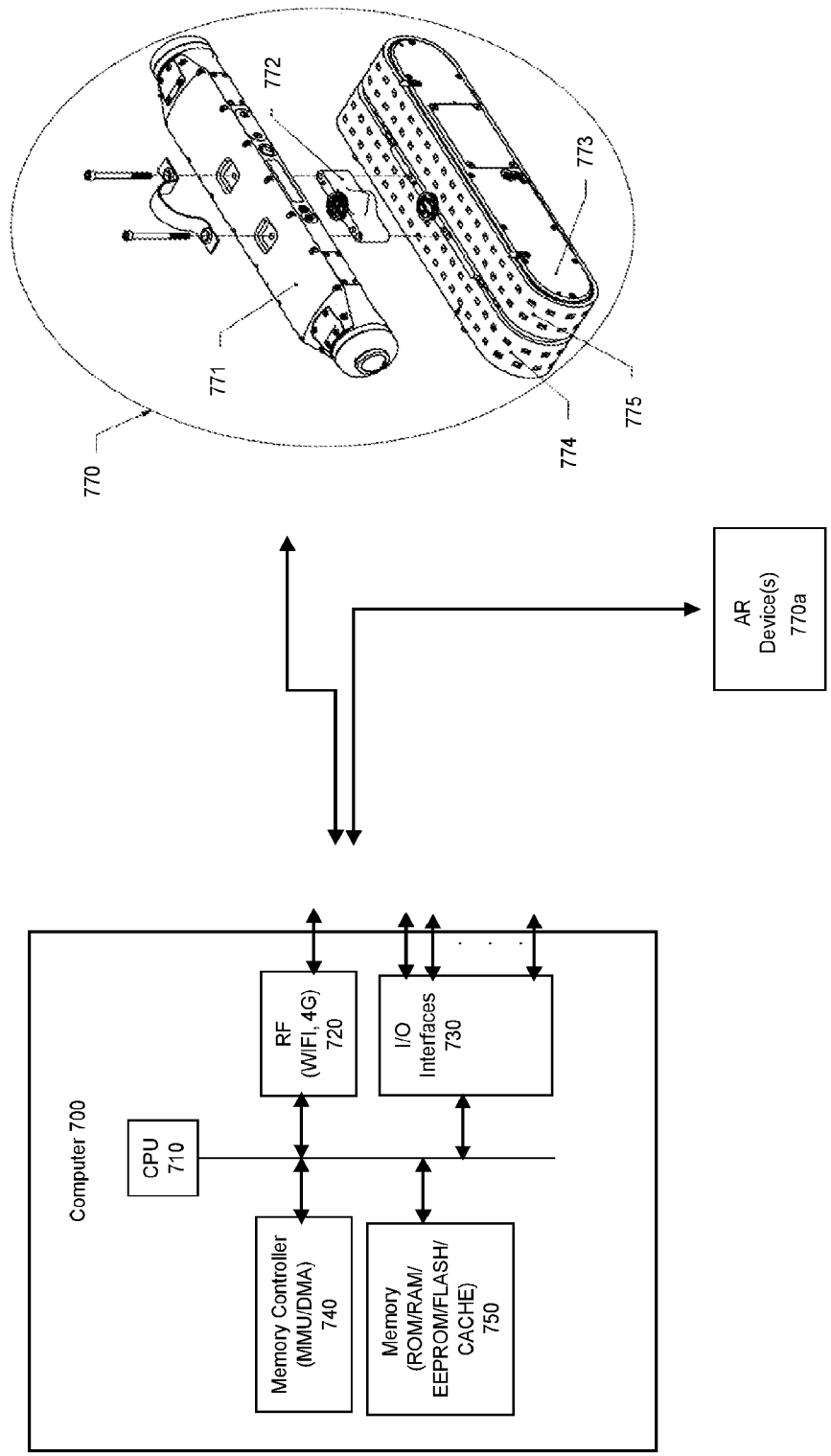
FIG. 7 illustrates an example system.

It will be readily understood that certain embodiments can be implemented using any of a wide variety of devices or combinations of devices. Referring to FIG. 7, an example system on chip (SoC) included in a computer 700 is illustrated, which may be used in implementing one or more embodiments. The SoC or similar circuitry outlined in FIG. 7 may be implemented in a variety of devices in addition to the computer 700, for example similar circuitry may be included in a pipe inspection robot 770, another device platform, and/or an AR system 770a. In addition, circuitry other than a SoC, an example of which is provided in FIG. 7, may be utilized in one or more embodiments. The SoC of FIG. 7 includes functional blocks, as illustrated, integrated onto a single semiconductor chip to meet specific application requirements.

The central processing unit (CPU) 710, which may include one or more graphics processing units (GPUs) and/or micro-processing units (MPUs), includes an arithmetic logic unit (ALU) that performs arithmetic and logic operations, instruction decoder that decodes instructions and provides information to a timing and control unit, as well as registers for temporary data storage. The CPU 710 may comprise a single integrated circuit comprising several units, the design and arrangement of which vary according to the architecture chosen.

Computer 700 also includes a memory controller 740, e.g., comprising a direct memory access (DMA) controller to transfer data between memory 750 and hardware peripherals. Memory controller 740 includes a memory management unit (MMU) that functions to handle cache control, memory protection, and virtual memory. Computer 700 may include controllers for communication using various communication protocols (e.g., I2C, USB, etc.).

Memory 750 may include a variety of memory types, volatile and nonvolatile, e.g., read only memory (ROM), random access memory (RAM), electrically erasable programmable read only memory (EEPROM), Flash memory, and cache memory. Memory 750 may include embedded programs and downloaded software, e.g., image processing software, pipe inspection mission software, etc. By way of example, and not limitation, memory 750 may also include an operating system, application programs, other program modules, and program data.

A system bus permits communication between various components of the computer 700. I/O interfaces 730 and radio frequency (RF) devices 720, e.g., WIFI and telecommunication radios, are included to permit computer 700 to send and receive data to remote devices using wired or wireless mechanisms. The computer 700 may operate in a networked or distributed environment using logical connections to one or more other remote computers or databases. The logical connections may include a network, such local area network (LAN) or a wide area network (WAN), but may also include other networks/buses. For example, computer 700 may communicate data with and between a pipe inspection robot 770 and AR devices 770a.

The computer 700 may therefore execute program instructions configured to store and analyze pipe data, and perform other functionality of the embodiments, as described herein. A user can interface with (for example, enter commands and information) the computer 700 through input devices, which may be connected to I/O interfaces 730. A display or other type of device, e.g., AR system 770a, may also be connected to the computer 700 via an interface selected from I/O interfaces 730, such as an output interface.

It should be noted that the various functions described herein may be implemented using instructions stored on a memory, e.g., memory 750, that are transmitted to and executed by a processor, e.g., CPU 710. Computer 700 includes one or more storage devices that persistently store programs and other data. A storage device, as used herein, is a non-transitory storage medium. Some additional examples of a non-transitory storage device or medium include, but are not limited to, storage integral to computer 700, such as a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections or through a hard wire connection, such as over a USB connection.

Pipe inspection robot(s) used for obtaining pipe scan data, as referenced herein, may take a variety of forms and the example shown in FIG. 7 is a non-limiting example. The pipe inspection robot 770 of FIG. 7 is an autonomous pipe inspection robot that includes a tractor module 773 with tracks 774, 775, situated beneath a riser 772 that supports a sensor module 771. Sensor module 771 comprises sensors, e.g., laser, sonar or visual sensors. Other pipe inspection robots may be used, e.g., a raft or floating platform, a larger tracked platform, etc. In an embodiment, a plurality of pipe inspection robots may be used to obtain pipe inspection data of various kinds.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

Although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of providing an augmented reality (AR) scene of pipe inspection data, comprising:
   obtaining, using a processor, pipe inspection data derived from a pipe inspection robot that traverses through the interior of an underground pipe, the pipe inspection data including a cylindrical, three-dimensional (3D) representation of the underground pipe;
   obtaining, using a processor, real-time visual image data of an above-ground surface;
   using computer vision to detect a surface feature in the real-time visual image data;
   detecting a related in-ground position feature in the pipe inspection data comprising a gap in the pipe inspection data to align at least a part of the pipe inspection data with the surface feature in the real-time visual image data;
   combining, using a processor, the pipe inspection data with the real-time visual image data in an AR scene; and
   displaying, using a display device, the AR scene.

2. The method of claim 1, comprising detecting a user input and updating the display of the AR scene in response to the user input.

3. The method of claim 2, wherein the updating the display of the AR scene comprises repositioning one or more of the pipe inspection data and the real-time visual image data within the AR scene.

4. The method of claim 3, wherein the updating the display of the AR scene comprises repositioning the pipe inspection data in response to user input selected from the group consisting of gesture input and voice input.

5. The method of claim 4, wherein the updating the display of the AR scene comprises transforming the pipe inspection data from the cylindrical representation of a pipe to a planar representation of a pipe.

6. The method of claim 1, wherein:
   the pipe inspection data comprises data relating to an in-ground position of the underground pipe; and
   the real-time visual image data comprises surface feature data indicating a position of a surface feature.

7. The method of claim 6, wherein the combining comprises using the data relating to the in-ground position of the underground pipe to align at least a part of the pipe inspection data with the surface feature in the real-time visual image data.

8. The method of claim 1, wherein:
   the surface feature in the real-time visual image data comprises at least a part of a physical man hole cover; and
   the related in-ground position feature in the pipe inspection data comprises a gap in the pipe inspection data associated with an opening in the underground pipe for a manhole.

9. A device, comprising:
   a display device,
   a camera;
   a processor; and
   a memory that stores processor executable instructions comprising:
   instructions that obtain, using the processor, pipe inspection data derived from a pipe inspection robot that traverses through the interior of an underground pipe, the pipe inspection data including a cylindrical, three-dimensional (3D) representation of the underground pipe;
   instructions that obtain, using the camera, real-time visual image data of an above-ground surface;
   instructions that use computer vision to detect a surface feature in the real-time visual image data;
   instructions that detect a related in-ground position feature in the pipe inspection data comprising a gap in the pipe inspection data to align at least a part of the pipe inspection data with the surface feature in the real-time visual image data;
   instructions that combine, using the processor, the pipe inspection data with the real-time visual image data in an augmented reality (AR) scene; and
   instructions that display, using the display device, the AR scene.

10. The device of claim 9, wherein the display device comprises a display device selected from the group consisting of a handheld two-dimensional display device and a head mounted display device.

11. The device of claim 9, comprising instructions that detect a user input and instructions that update the display of the AR scene in response to the user input.

12. The device of claim 11, wherein the user input includes one or more of movement of the display device, gesture input and voice input.

13. The device of claim 11, wherein the instructions that update the display of the AR scene comprise instructions that reposition one or more of the pipe inspection data and the real-time visual image data within the AR scene.

14. The device of claim 13, wherein the instructions that update comprise instructions that transform the pipe inspection data from the cylindrical representation of a pipe to a planar representation of a pipe.

15. The device of claim 9, wherein:
   the pipe inspection data comprises data relating to an in-ground position of the underground pipe; and
   the real-time visual image data comprises surface feature data indicating a position of a surface feature.

16. The device of claim 15, wherein the instructions that combine comprise instructions that use the data relating to the in-ground position of the underground pipe to align at least a part of the pipe inspection data with the surface feature in the real-time visual image data.

17. The device of claim 16, wherein:
   the surface feature in the real-time visual image data comprises at least a part of a physical man hole cover; and
   the related in-ground position feature in the pipe inspection data comprises a gap in the pipe inspection data associated with an opening in the underground pipe for a manhole.

18. A computer program product, comprising:
   a non-transitory storage medium that stores processor executable instructions, comprising:
   instructions that obtain pipe inspection data derived from a pipe inspection robot that traverses through the interior of an underground pipe, the pipe inspection data including a cylindrical, three-dimensional (3D) representation of the underground pipe;
   instructions that obtain real-time visual image data of an above-ground surface;
   instructions that use computer vision to detect a surface feature in the real-time visual image data;
   instructions that detect a related in-ground position feature in the pipe inspection data comprising a gap in the pipe inspection data to align at least a part of the pipe inspection data with the surface feature in the real-time visual image data;

instructions that combine the pipe inspection data with the real-time visual image data in an augmented reality (AR) scene; and instructions that display, using the display device, the AR scene.

\* \* \* \* \*